United States Patent
Wheelwright et al.

(10) Patent No.: US 12,474,581 B2
(45) Date of Patent: Nov. 18, 2025

(54) FREE-FORM LIGHT FIELD DISPLAYS FOR VR/AR HEADSETS

(71) Applicant: Meta Platforms Technologies, LLC, Menlo Park, CA (US)

(72) Inventors: Brian Wheelwright, Sammamish, WA (US); Ying Geng, Bellevue, WA (US); Kieran Connor Kelly, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 608 days.

(21) Appl. No.: 17/847,730

(22) Filed: Jun. 23, 2022

(65) Prior Publication Data

US 2022/0413297 A1     Dec. 29, 2022

Related U.S. Application Data

(60) Provisional application No. 63/214,606, filed on Jun. 24, 2021.

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0081* (2013.01); *G02B 27/0093* (2013.01);
(Continued)

(58) Field of Classification Search
CPC .............. G02B 27/01; G02B 27/0101; G02B 27/0103; G02B 27/0172; G02B 27/0176;
(Continued)

(56) References Cited

U.S. PATENT DOCUMENTS 11,016,302 B2   5/2021 Freeman et al.
11,087,701 B1 *  8/2021 Chen ................... G02B 6/0055
(Continued)

FOREIGN PATENT DOCUMENTS

EP    3633419 A1    4/2020
JP    2015172616 A  10/2015

OTHER PUBLICATIONS

EPO—Invitation to Pay Additional Fees for International Application No. PCT/US2022/035020, mailed Oct. 5, 2022, 10 pages.
(Continued)

*Primary Examiner* — Sultan Chowdhury
(74) *Attorney, Agent, or Firm* — Greenberg Traurig, LLP

(57) ABSTRACT

A head mounted display for virtual reality imaging includes a pixel array including multiple pixels configured in a two-dimensional surface, each pixel providing multiple light beams forming an image provided to a user. The head mounted display also includes a first optical element to provide a central portion of a field of view for the image through an eyebox that limits a volume including a pupil of the user, and a second optical element to provide a peripheral portion of the field of view for the image through the eyebox. The second optical element includes a lenslet array to provide a segmented view of the peripheral portion of the field of view that includes at least one of a free form lenslet, a liquid crystal lenslet, a Fresnel lenslet, or a pancake lenslet. A system and a method for using the above head mounted display are also provided.

20 Claims, 19 Drawing Sheets

(51) Int. Cl.
  *G06F 3/01* (2006.01)
  *G09F 9/30* (2006.01)
(52) U.S. Cl.
  CPC .......... *G02B 27/0176* (2013.01); *G06F 3/011*
       (2013.01); *G09F 9/301* (2013.01); *G02B*
       *2027/0123* (2013.01); *G02B 2027/0138*
       (2013.01); *G02B 2027/014* (2013.01); *G02B*
       *2027/0147* (2013.01); *G02B 2027/0178*
       (2013.01); *G02B 2027/0187* (2013.01)
(58) Field of Classification Search
  CPC ............ G02B 27/0081; G02B 27/0093; G02B
       2027/014; G02B 2027/0123; G02B
       2027/0138; G02B 2027/0147; G02B
       2027/0178; G02B 2027/0187; G06F
       3/011; G09F 9/301; G09F 19/125
  See application file for complete search history.

(56) References Cited

U.S. PATENT DOCUMENTS

| | | | |
|---|---|---|---|
| 2012/0188148 | A1 | 7/2012 | DeJong |
| 2014/0022286 | A1 | 1/2014 | Chen et al. |
| 2014/0266990 | A1 | 9/2014 | Makino et al. |
| 2017/0038589 | A1* | 2/2017 | Jepsen ............... G02B 27/0093 |
| 2017/0055825 | A1 | 3/2017 | Tumlinson |
| 2018/0003963 | A1 | 1/2018 | Benitez et al. |
| 2018/0090052 | A1 | 3/2018 | Marsh et al. |
| 2018/0203231 | A1* | 7/2018 | Glik .................... G02B 27/0081 |
| 2018/0217632 | A1 | 8/2018 | Tseng et al. |
| 2019/0020869 | A1* | 1/2019 | Perreault .............. H04N 13/383 |
| 2019/0045176 | A1 | 2/2019 | Ratcliff et al. |
| 2019/0064526 | A1 | 2/2019 | Connor |
| 2019/0107719 | A1 | 4/2019 | Edwin et al. |
| 2019/0129174 | A1 | 5/2019 | Perreault |
| 2019/0250405 | A1 | 8/2019 | Leighton et al. |
| 2019/0356907 | A1 | 11/2019 | Iguchi |
| 2020/0192098 | A1* | 6/2020 | Rong ................. G02B 27/0172 |
| 2020/0348518 | A1* | 11/2020 | Georgiou ........... G02B 27/0172 |
| 2021/0080730 | A1* | 3/2021 | Morrison ........... G02B 27/0179 |
| 2022/0179214 | A1 | 6/2022 | Lee et al. |

OTHER PUBLICATIONS

Boger Y., "The VRGuy's Blog: Converting Diagonal Field of View and Aspect Ratio to Horizontal and Vertical Field of View," Apr. 23, 2016, [Retrieved on Jun. 4, 2022], 3 pages, Retrieved from internet: URL: http://vrguy.blogspot.com/2013/04/converting-diagonal-field-of-view-and.html.

EPO—International Search report and Written Opinion for International Application No. PCT/US2022/035020, mailed Nov. 28, 2022, 15 pages.

EPO—Invitation to Pay Additional Fees for International Application No. PCT/US2022/035014, Oct. 26, 2022, 11 pages.

* cited by examiner

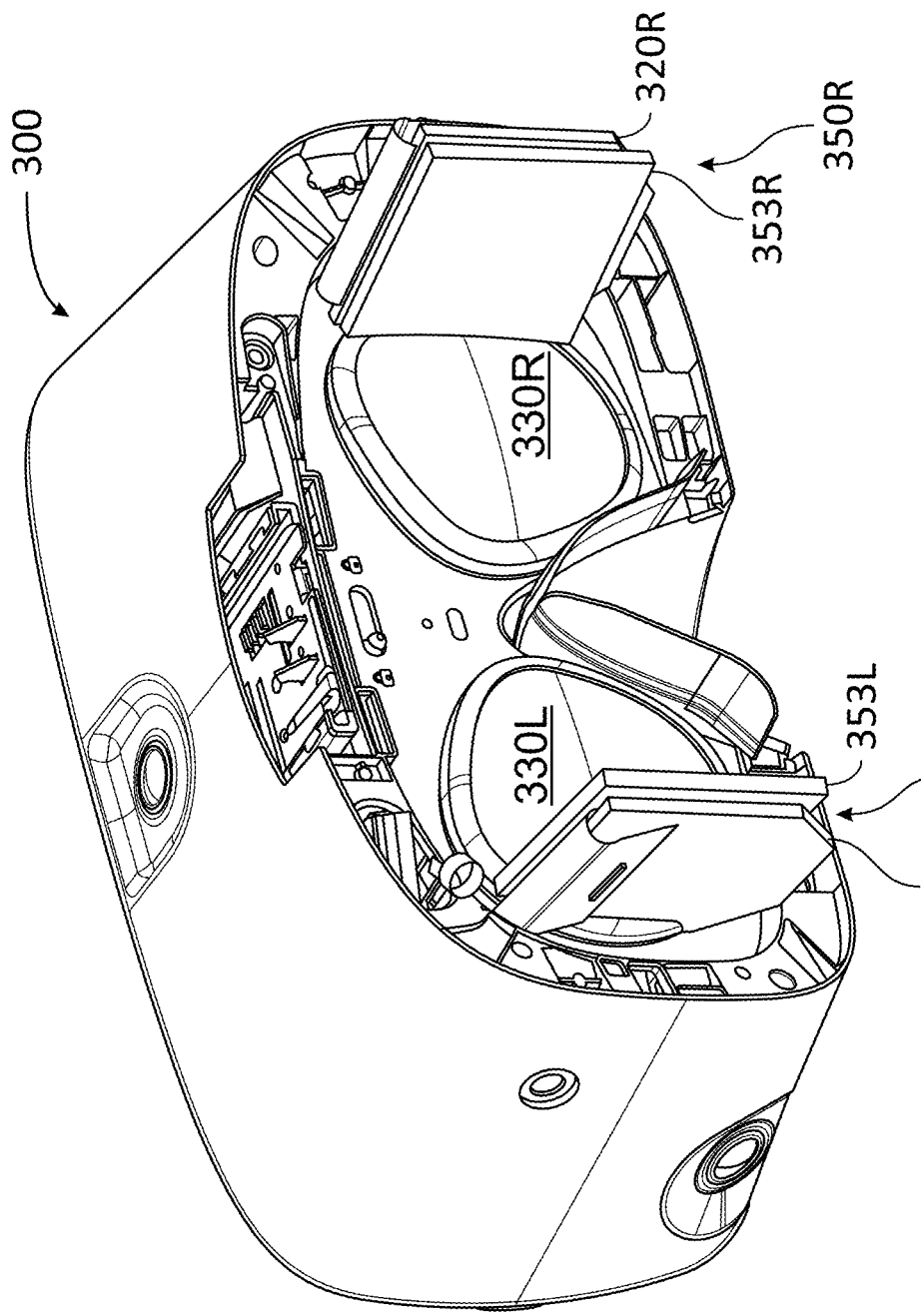

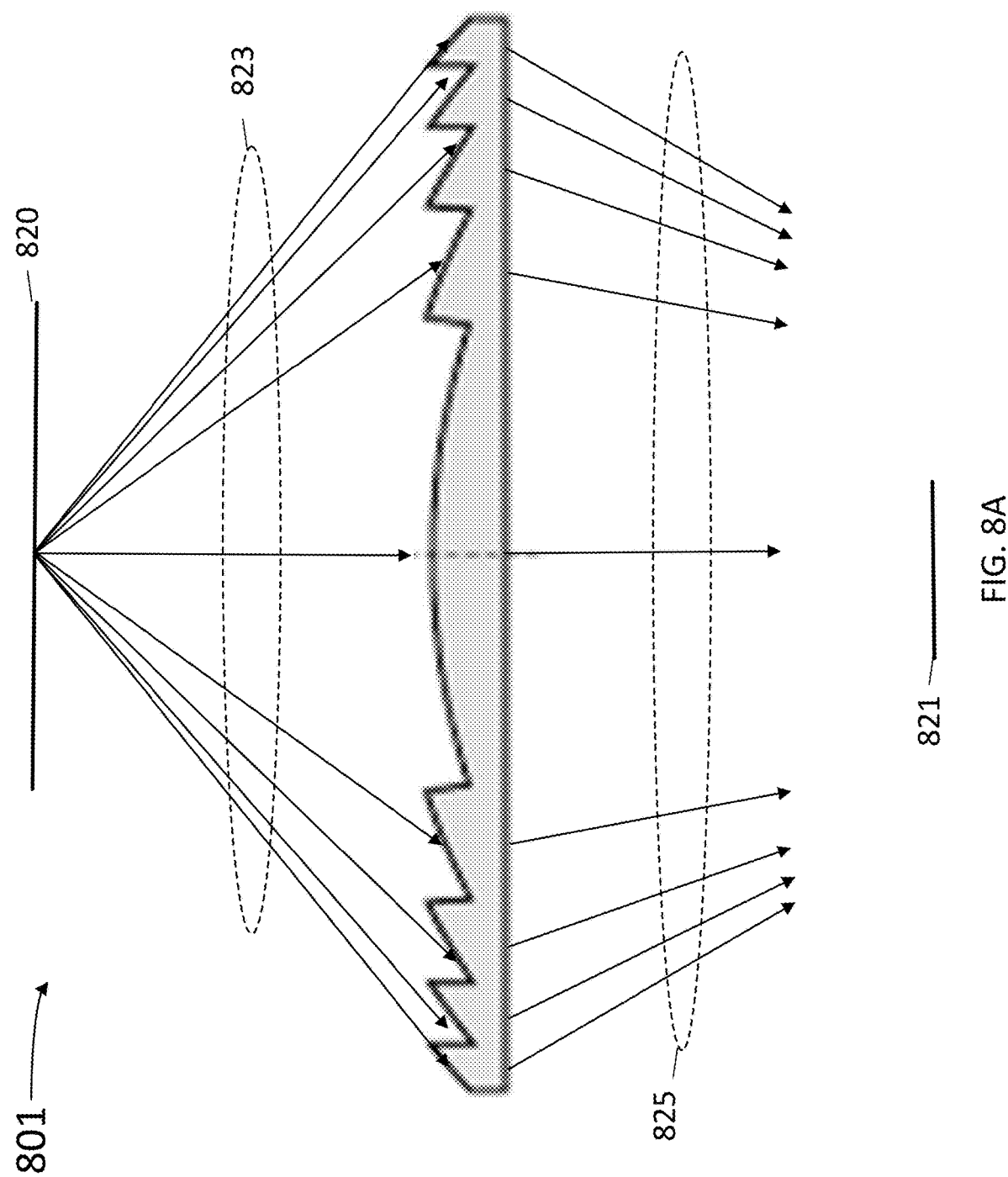

FREE-FORM LIGHT FIELD DISPLAYS FOR VR/AR HEADSETS

CROSS-REFERENCE TO RELATED APPLICATIONS

The present disclosure is related and claims priority under 35 U.S.C. § 119(e) to U.S. Prov. Pat. Appln. No. 63/214,606, entitled LIGHT FIELD DISPLAY FOR PERIPHERAL VIEW IN VIRTUAL REALITY HEADSETS, to Brian Wheelwright, et al., filed on Jun. 24, 2021, the contents of which applications are hereby incorporated by reference in their entirety, for all purposes.

BACKGROUND

Field

The present disclosure is related to headsets for use in virtual reality (VR) applications that include a peripheral display. More specifically, the present disclosure is related to headsets that provide peripheral view using freeform multi-lenslet arrays (MLAs) in light field displays.

Related Art

In the field of virtual reality headsets, much focus is devoted to the binocular field of view (FOV) of the user, which includes about 60° up, 50° nasally and peripherally, and 75° down. This is about 2.5 Sr. Current VR devices support most of this binocular (or "stereo") portion of the field of view, but service very little of the periphery (visible to one eye only) or the lower binocular field. To provide a fully immersive experience to viewers, large portions of the peripheral view is desirable. Human vision includes a peripheral field of view that is more than 200° horizontal and more than 115° vertical (about 5.3 Sr total). Current optical applications are unable to incorporate this peripheral field of view (FOV) in a compact, light headset that a viewer can comfortably use and move around with.

SUMMARY

In a first embodiment, a device for virtual reality imaging includes a pixel array including multiple pixels configured in a two-dimensional surface, each pixel providing multiple light beams forming an image provided to a user, a first optical element configured to provide a central portion of a field of view for the image through an eyebox that limits a volume including a pupil of the user, and a second optical element configured to provide a peripheral portion of the field of view for the image through the eyebox, wherein the second optical element includes a lenslet array to provide a segmented view of the peripheral portion of the field of view that includes multiple lenslets selected from at least one of: a free form lenslet, a liquid crystal lenslet, a Fresnel lenslet, and a pancake lenslet.

In a second embodiment, a display includes a pixel array configured in a two-dimensional surface, a multi-lenslet array configured to provide a light from at least one of: a free-form lenslet, a liquid crystal lenslet, a Fresnel lenslet, and a pancake lenslet to a retina of a user of the display, a memory that stores multiple instructions, and one or more processors configured to execute the instructions to activate each of multiple segments in the pixel array to emit light beams forming a portion of a peripheral field of view of an image, each portion providing a different field of view of the image, wherein the image is projected on a retina of a user of a head mounted display through an eyebox delimiting a position of a pupil of the user.

In a third embodiment, a method for digital calibration of a light field display includes capturing, with a camera, an image of a pixel array through a multi-lenslet array in a light field display for a head mounted display device that includes multiple lenslets selected from at least one of: a free-form lenslet, a liquid crystal lenslet, a Fresnel lenslet, and a pancake lenslet, the image associated with a pupil location of a user of the head mounted display device. The method also includes obtaining an angular map of the pixel array from the image of the pixel array, wherein the angular map includes an angle of multiple light beams from each active pixel in the pixel array, and storing the angular map in a memory of the head mounted display device, based on the pupil location.

In a fourth embodiment, a method for aligning a head mounted display includes disposing a multi-lenslet array adjacent to a pixel array, the pixel array configured in a two-dimensional surface, each pixel providing multiple light beams to the multi-lenslet array to form an image. The method also includes rotating the multi-lenslet array about its center until the image projection shows a full view without overlapping features and translating the multi-lenslet array from its center along a plane of the multi-lenslet array, until the image projection shows a full view without overlapping features.

In yet other embodiments, a non-transitory, computer-readable medium stores instructions which, when executed by a processor in a computer, cause the computer to perform a method of using a head mounted display. The method includes activating one or more pixels in a first pixel array configured to provide light beams forming a central portion of a field of view for an image provided to a user of an head mounted display, activating at least one of multiple segments in a second pixel array configured to provide light beams forming a peripheral portion of the field of view for the image provided to the user of the head mounted display, and selecting a portion of the peripheral field of view for each of two adjacent segments in the second pixel array to form a continuous image in the retina of the user through an eyebox limiting a volume that includes a location of a pupil of the user of the head mounted display.

BRIEF DESCRIPTION OF THE DRAWINGS

FIGS. 8A-8B illustrate a Fresnel lenslet for an MLA to collect light from a light field display to provide a peripheral FOV to an HMD user, according to some embodiments.

In the figures, elements having the same or similar reference numerals share the same or similar features, unless otherwise explicitly expressed.

DETAILED DESCRIPTION

Figure 1A:
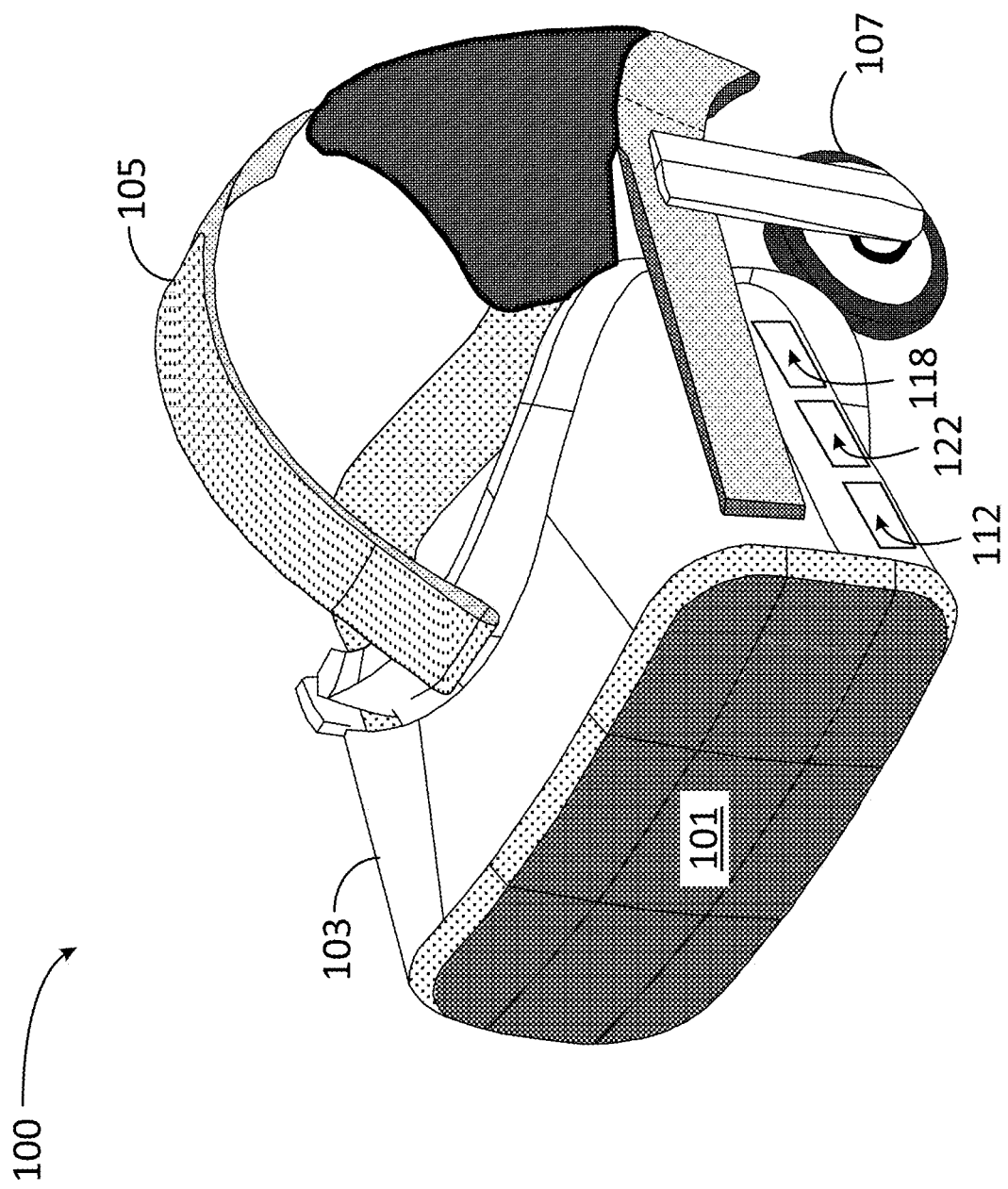
FIGS. 1A-1B illustrate an exemplary head mounted display (HMD), according to some embodiments.

Embodiments of a peripheral display are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments as disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head mounted display (HMD) connected to a host computer system, a standalone HMD, a mobile device or computing system, or any other hardware platform capable of providing artificial reality content to one or more viewers.

In some embodiments of the disclosure, "near-eye" may be defined as including an optical element that is configured to be placed within 35 mm of an eye of a user while a near-eye optical device such as an HMD (head mounted display) is being utilized.

In VR (virtual reality) displays, there are limited options for extending the field of view to cover the human visual field. Some options include filling the periphery with sparse LEDs or a bare display panel, but these both lack in resolution even compared to the low resolution of the human eye at large angles. Other approaches may include tiling (e.g., 'split lens' architectures). With enough tiles, this provides excellent coverage, but over-performs in resolution and is bulky.

To resolve the above problems, an HMD as disclosed herein includes a first optical element to provide a central FOV through the HMD eyebox. The HMD also includes a second optical element to provide a peripheral FOV through the eyebox. The second optical element includes an MLA to provide a segmented view of the peripheral FOV. The MLA may be a free-form MLA, a liquid crystal MLA, a Fresnel MLA, or a pancake MLA, or any combination of these in series. The MLA is closely disposed next to a display. Any two adjacent lenslets in the MLA form a continuous image on the retina of the user from two adjacent segmented portions of active pixels in the display.

To provide a wide peripheral view in AR/VR applications, some embodiments use a light field display having segmented portions of active pixels separated by a gap of inactive pixels. Light field displays are compact and provide a generous eyebox and FOV, while potentially trading away angular resolution. Accordingly, while the first optical element may desirably have a high resolution for the central FOV, the second optical element may admit a lower angular resolution for a wider, peripheral FOV afforded by MLAs and light field displays. In some embodiments, the resolution of the second optical element (as determined by the MLA) may gradually decrease between a borderline area adjacent to the first optical element towards the end of the headset. Accordingly, some embodiments may include MLAs having a transitional area close to the first optical element wherein the lenslets in the MLA have a higher numerical aperture (e.g., larger angular resolution) close to the first optical element.

In this disclosure, some embodiments include a flat peripheral light field display with a freeform lenslet tailored to match the needs of the periphery. Some embodiments include a curved peripheral light field display with a freeform lenslet and conical display that wraps around the central optic, from the outer brow to the lower cheek of the viewer. This single display fills the entire (or substantially the entire) peripheral FOV.

FIG. 1A illustrates an exemplary HMD 100, according to some embodiments. For example, HMD 100 may be a virtual reality (VR) HMD. HMD 100 includes a front panel 101, a visor 103, and a strap 105. Front panel 101 includes and protects a display for the user, visor 103 adjusts HMD 100 on the user, and strap 105 keeps HMD 100 tightly fit on the user's head. An audio device 107 provides sound to the user.

In some embodiments, HMD 100 may include a processor circuit 112 and a memory circuit 122. Memory circuit 122 may store instructions which, when executed by processor circuit 112, cause HMD 100 to execute a method as disclosed herein. In addition, HMD 100 may include a communications module 118. Communications module 118 may include radio-frequency software and hardware configured to wirelessly communicate processor 112 and memory 122 with an external network, or some other device. Accordingly, communications module 118 may include radio antennas, transceivers, and sensors, and also digital processing circuits for signal processing according to any one of multiple wireless protocols such as Wi-Fi, Bluetooth, Near field contact (NFC), and the like. In addition, communications module 118 may also communicate with other input tools and accessories cooperating with HMD 100 (e.g., handle sticks, joysticks, mouse, wireless pointers, and the like).

Figure 1B:
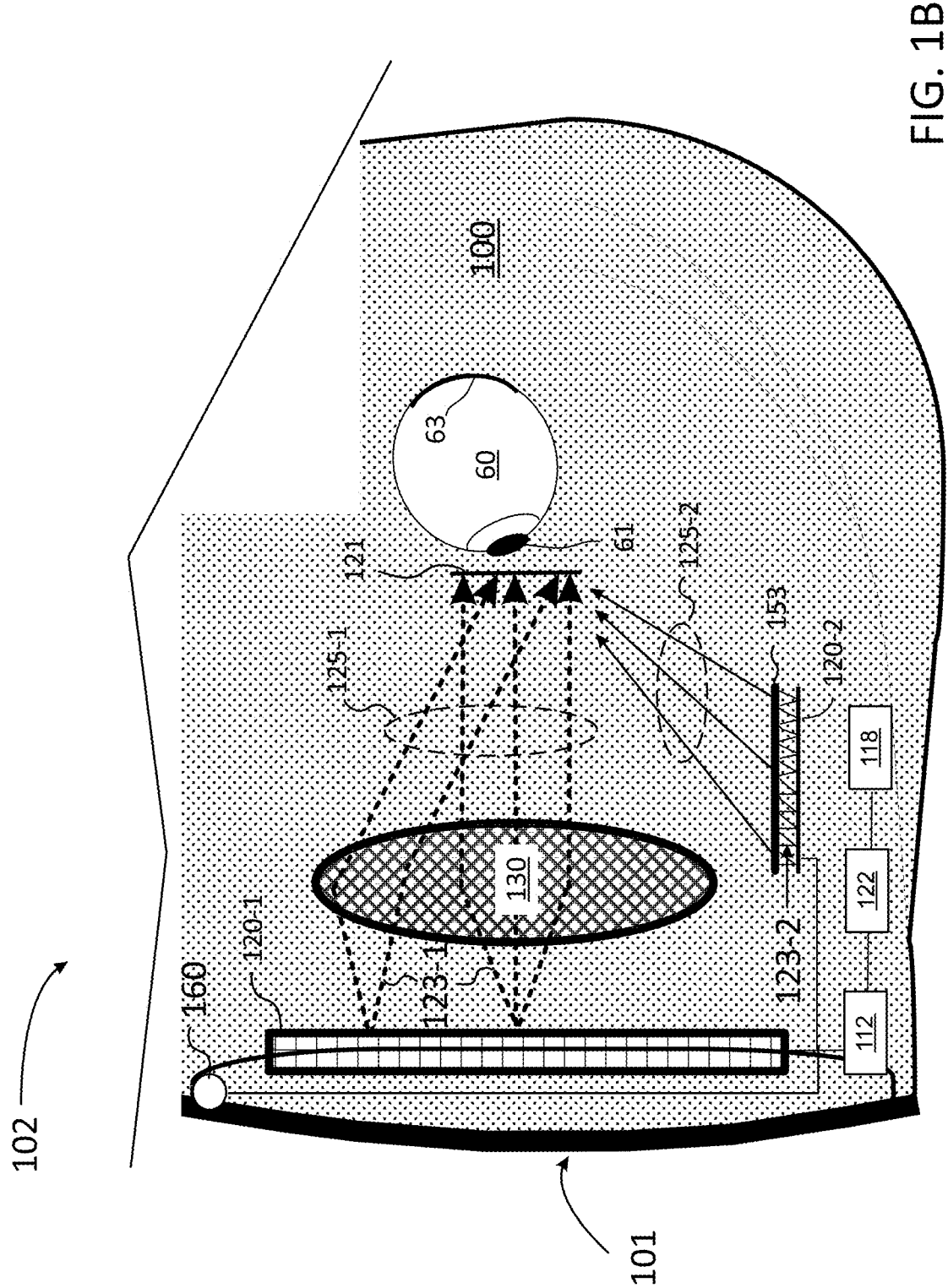

FIG. 1B illustrates a partial view of a left side view 102 of HMD 100 corresponding to the left eye 60 of a user. HMD 100 may include two mirror images of left side view 102 each having the same or similar elements as illustrated in left side view 102. The choice of the left side in FIG. 1B is arbitrary, and all components therein may be present in the right side of HMD 100. HMD 100 includes a pixel array 120-1 and a pixel array 120-2 (hereinafter, collectively referred to as "pixel arrays 120"). Pixel arrays 120 include multiple pixels configured in a two-dimensional surface (e.g., a flat surface oriented in one direction as in pixel array 120-1, and one or two flat surfaces oriented in a different direction as in pixel array 120-2). Each pixel in pixel arrays 120 provides multiple light beams 123-1 and 123-2 (hereinafter, collectively referred to as "display light beams 123") forming an image provided to a user. An optical element 130 is configured to provide a central portion of an FOV for the image through an eyebox 121. The central portion of the FOV for the image may include light beams 125-1. An optical element 153 provides a peripheral portion of the FOV for the image through eyebox 121 including light beams 125-2. Light beams 125-1 and 125-2 will be collectively referred to, hereinafter, as "eyebox light beams 125." Eye 60 includes a pupil 61, to accept at least some of eyebox light beams 125, and a retina 63, where the image is projected. Front panel 101 and communications module 118 are also illustrated (cf. FIG. 1A).

In some embodiments, optical elements 130 and 153 may include one or more optical elements such as diffractive elements (gratings and prisms), refractive elements (lenses), guiding elements (e.g., planar waveguides and/or fibers), and polarizing elements (e.g., polarizers, half-wave plates, quarter wave-plates, polarization rotators, Pancharatnam-Berry Phase lens —PBP—, and the like). In some embodiments, optical elements 130 and 153 may include one or more passive elements combined with one or more active elements, such as a liquid crystal (LC) variable wave plate or variable polarize.

In some embodiments, pixel array 120-2 may be divided into active pixel segments, and optical element 153 may include a multi-lenslet array wherein each lenslet directs light beams 123-2 from at least one pixel segment into eyebox 121. In some embodiments, optical element 153 may include a freeform multi-lenslet array. Accordingly, light beams 125-2 provide a segmented view of the peripheral FOV that forms a continuous projection of the periphery of the image on retina 63 through eyebox 121 and pupil 61 by overlapping FOV frustums from different active pixel segments. In some embodiments, processor 112 activates each of the segments in pixel array 120-2 to emit light beams 123-2 forming a portion of a peripheral FOV. Each portion of the peripheral FOV from each segment may include a different angle of view of the image.

In some embodiments, HMD 100 includes one or more sensors 160 to determine a position of pupil 61 within eyebox 121. Sensor 160 then sends the information about the position of pupil 61 within eyebox 121 to processor 112. Accordingly, processor 112 may determine a gaze direction of the user, based on the position of pupil 61 within eyebox 121. In some embodiments, memory 122 includes instructions for processor 112 to select the peripheral field of view of the image based on a gaze direction of the viewer and the position of pupil 61 within eyebox 121. In some embodiments, memory 122 contains display calibration instructions which change how the virtual image is mapped to pixel arrays 120 based on pupil location and/or gaze direction.

Figure 2A:
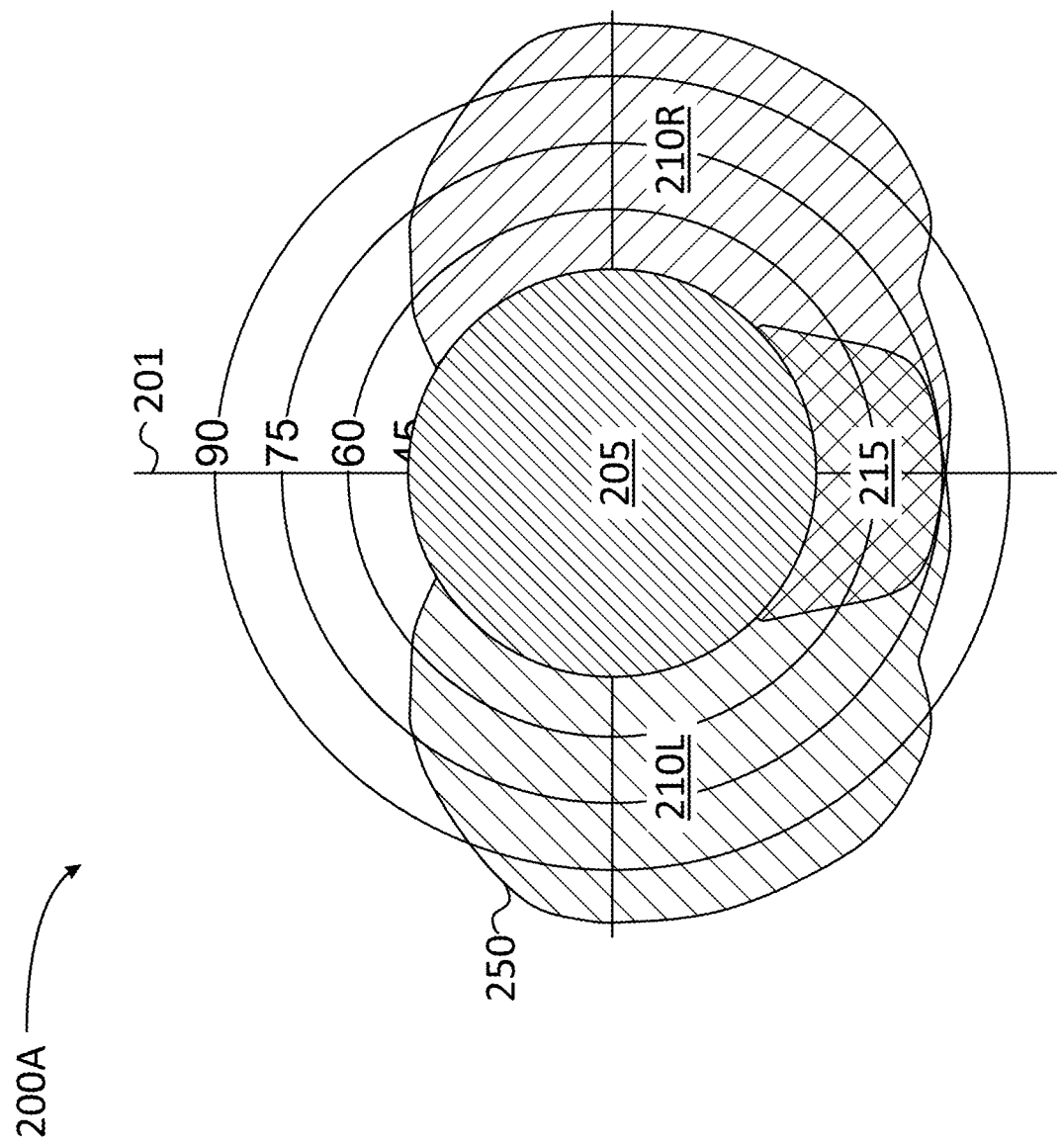
FIGS. 2A-2C illustrate an FOV of human vision including a central portion, a peripheral left portion, and a peripheral right portion, according to some embodiments.
Figure 2B:
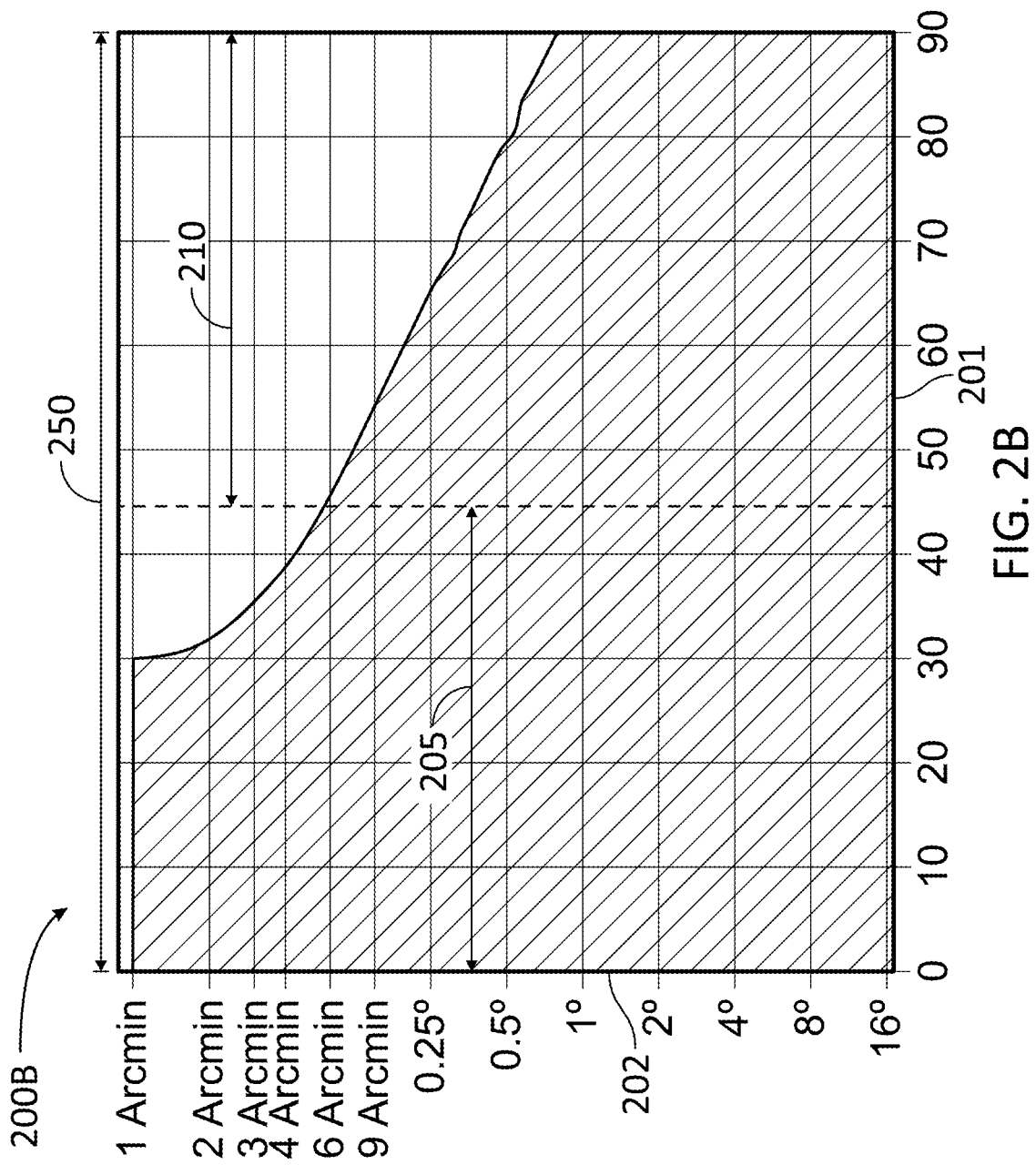
Figure 2C:
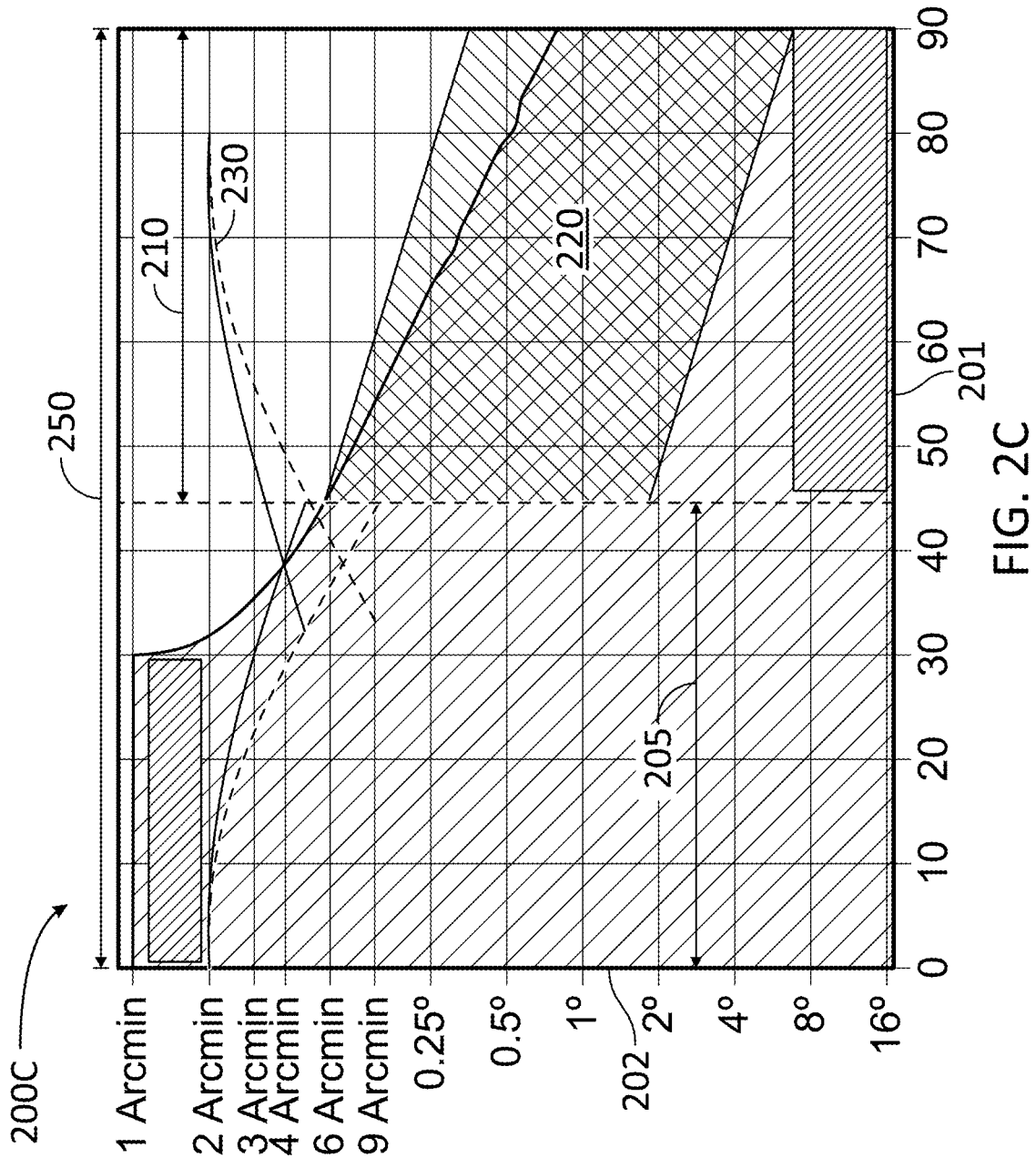

FIGS. 2A-2C illustrate charts 200A, 200B, and 200C for a field of view (FOV) 250 of human vision. FOV 250 includes a central portion 205, a peripheral left portion 210L, and a peripheral right portion 210R (hereinafter, collectively referred to as peripheral portions 210), according to some embodiments, measured according to an angular aperture 201. Angular aperture 201 is measured azimuthally relative to a direction pointing normal to and straight out of the face of the user (which corresponds to 0°).

FIG. 2A illustrates chart 200A with a left eye portion 210L and a right eye portion 210R as a function of angular aperture 201 (in degrees). This represents the human visual field without eye rotation. Peripheral portions 210 may have some overlap in a binocular portion 215, included within the lower peripheral FOV. Central portion 205 includes the combined FOV from both eyes, within a 45° angle from the normal, that is, central portion 205 includes a binocular FOV. According to chart 200A, peripheral portions 210 may include about 60% of total FOV 250.

FIG. 2B illustrates an approximated performance chart 200B of human vision for the entire FOV 250, wherein the abscissae (e.g., the X-axis) indicates angular aperture 201, and the ordinates (e.g., the Y-axis) indicate an angular resolution 202, expressed in arc minutes (arcmins). Performance chart 200B assumes that the eye rotates up to 30° away from center in casual scenarios. Thus, 1 arcmin "foveal" resolution is maintained up to 30° radially and the human eye performance decreases steadily beyond 30° down to about 1 degree resolution at 90° angular aperture (e.g., near the edge of FOV 250). The human eye performance within central portion 205 may drop to as low as about 6 arcmins at the edges. Peripheral portions 210 are also illustrated (cf. FIG. 2A).

FIG. 2C illustrates a performance chart 200C for different optical configurations of an HMD, compared with the human performance. As in chart 200B, angular resolution 202 is plotted against angular aperture 201. A split lens configuration 230 captures peripheral portions 210 at a relatively high resolution. The dashed lines indicate a design-based performance range of the split lens. The tradeoff of split lens configuration 230 is the form factor for HMD applications (including the weight of the lenses uses, and the like).

A light field display configuration 220 is able to keep on par with the regular eye vision performance for approximately the entire span of peripheral portions 210. In some embodiments, the resolution of light field configuration 220 may be limited by the number of pixels per inch (PPI) in the pixel array (e.g., pixel arrays 120), and also by the focal length of a lenslet in the multi-lenslet array (e.g., optical element 153).

Figure 3B:
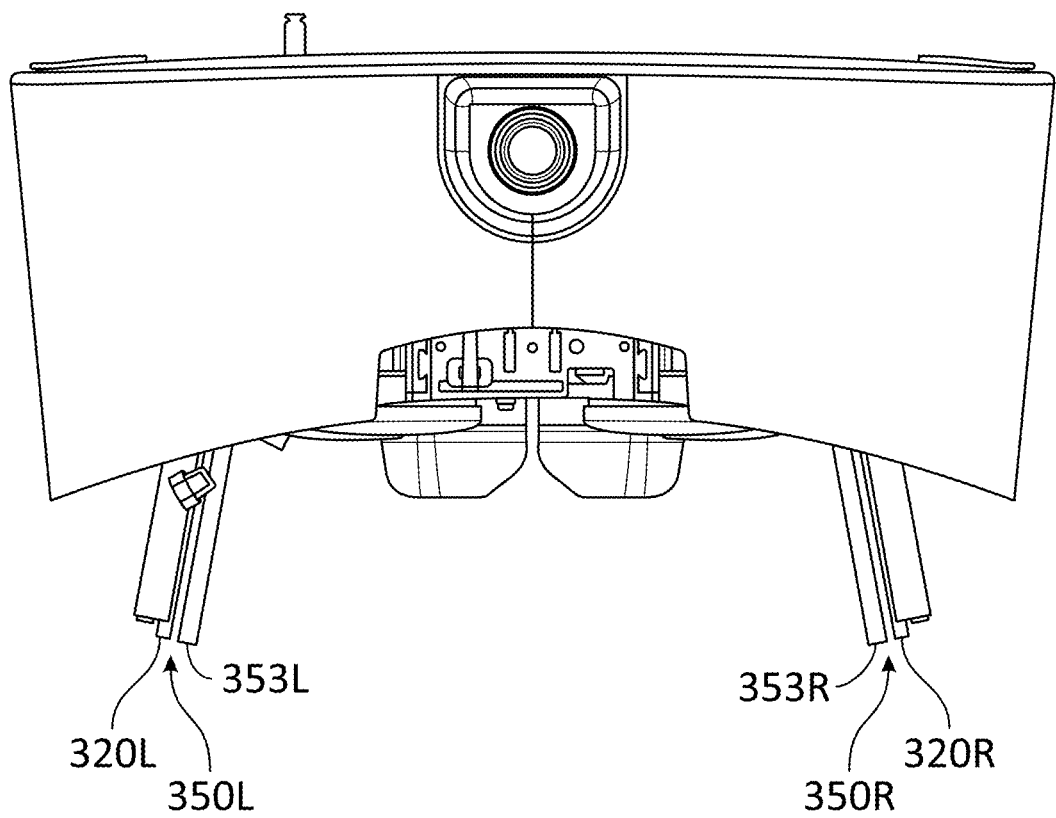
FIG. 3 illustrates an HMD having peripheral light field displays to provide a peripheral FOV to a user, according to some embodiments.

FIG. 3 illustrates an HMD 300 having peripheral light field displays 350L and 350R (collectively referred to as "light field displays 350"). In some embodiments, light field displays include lenslet arrays with mini-lenses having dimensions of approximately 1 mm to provide accommodation focus for a user viewing the display. In some embodiments, a light field display described in this disclosure may include lenslet arrays having micro-lenses with dimensions of approximately 3-6 mm that may not necessarily provide accommodation focus to the eye.

Light field display 350L includes a pixel array 320L and a lenslet array 353L to provide peripheral display light emitted by pixel array 320L to the peripheral FOV of a left eye of a user. Light field display 350R includes a pixel array 320R and a lenslet array 353R to provide peripheral display light emitted by pixel array 320R to the peripheral FOV of a right eye of the user of HMD 300. Pixel arrays 320L and 320R (collectively referred to as pixel arrays 320) may be OLED displays or LCDs, for example. Lenslet arrays 353L and 353R (collectively referred to as lenslet arrays 353) may be flat lenslet arrays configured with square tessellation, hexagonal tessellation, and/or hexapolar tessellation. An advantage of hexapolar tessellation is that the number of unique prescriptions can be reduced due to rotational symmetry (e.g., a lenslet with 9 rows only requires 9 unique prescriptions). A primary display of HMD 300 (not illustrated) is disposed behind central optics 330L and 330R.

Figure 4:
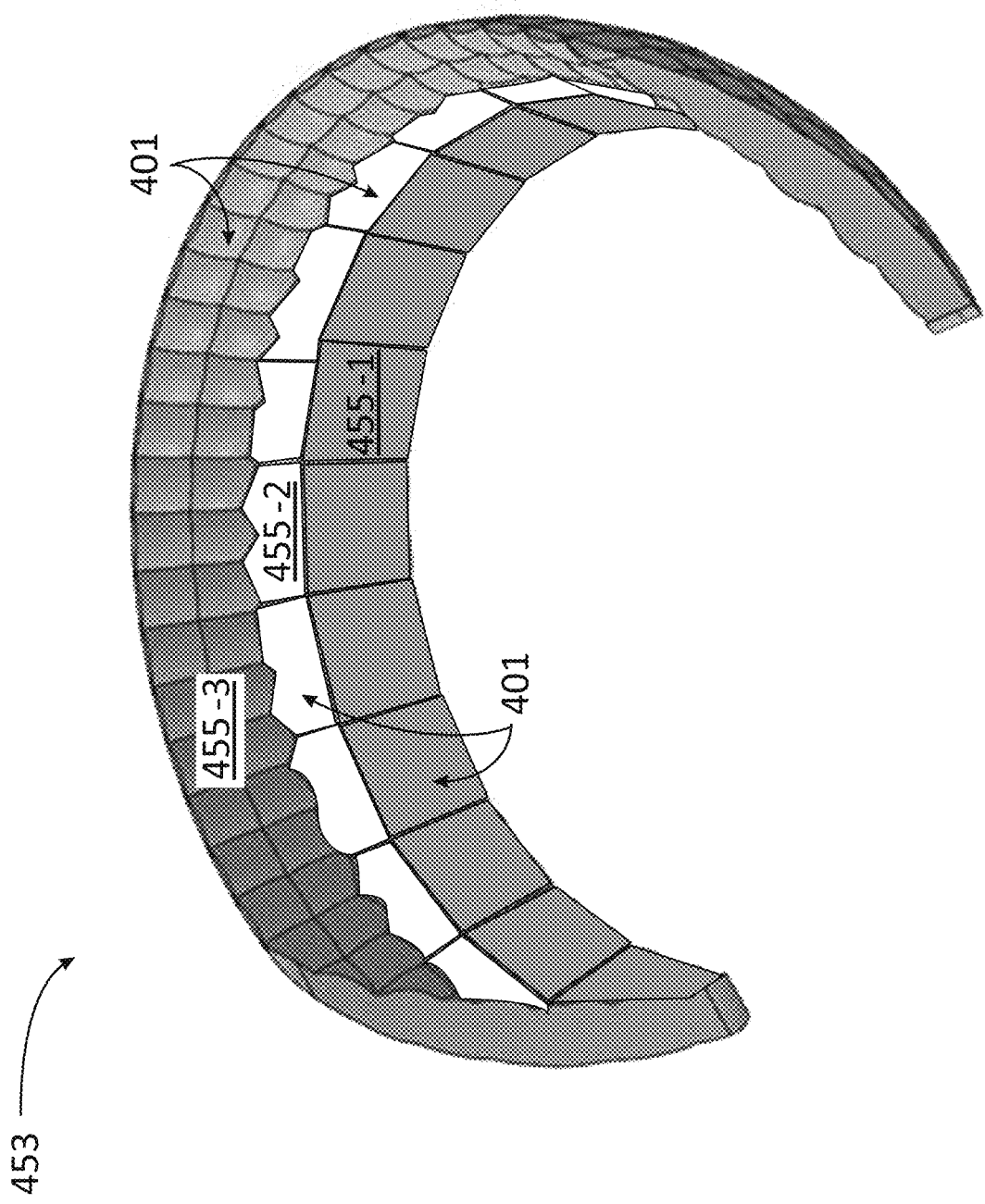
FIG. 4 illustrates an MLA to collect light from a light field display to provide a peripheral FOV to an HMD user, including a varying angular resolution, according to some embodiments.

FIG. 4 illustrates an MLA 453 to collect light from a display to provide a peripheral FOV to an HMD user, including a varying angular resolution, according to some embodiments. MLA 453 includes a series of lenslet rows 455-1, 455-2, and 455-3 (hereinafter, collectively referred to as "lenslet rows 455"). Lenslet row 455-1 is closer to the first optical element providing a central FOV, and includes somewhat larger lenslets 401 that have a higher NA and/or longer focal length (as deduced from their larger lateral dimension) and therefore provide a higher angular resolution. Lenslet row 455-2 is farther from the first optical element, thus covering a peripheral portion of the FOV that is further away from the HMD user angle and includes somewhat smaller lenslets 401 that have a lower NA and/or shorter focal length (as deduced from their larger lateral dimension) and therefore provide a lower angular resolution than those in lenslet row 455-1, which is less critical for the HMD user (cf. peripheral portions 210). Lenslet row 455-3 is on the outer edge of MLA 453, and therefore covers an area of peripheral FOV where angular resolution is least critical for the HMD user (cf. ditto). Lenslets 401 in lenslet row 455-3 are dimensionally smaller and therefore have a lower NA and/or smaller focal length, leading to a reduced angular resolution.

Figure 5A:
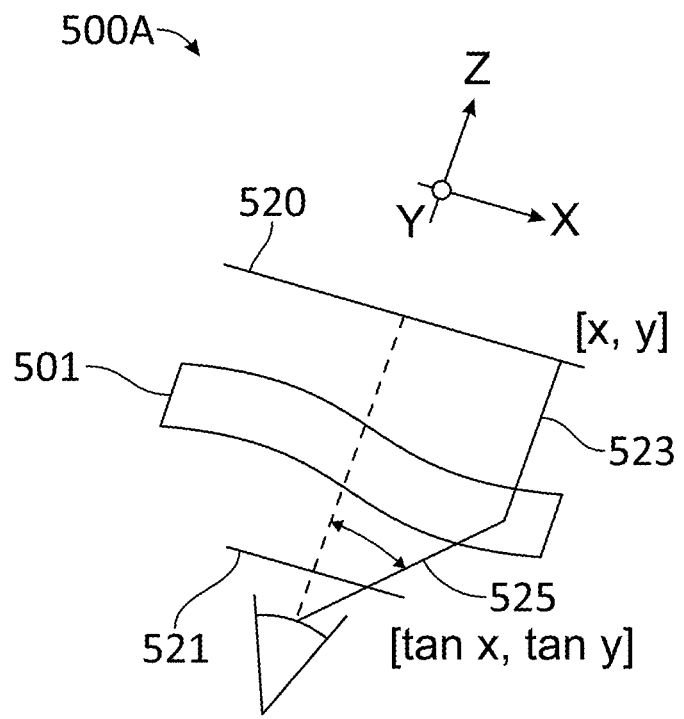
FIGS. 5A-5C illustrate a free-form lenslet for an MLA to collect light from a light field display to provide a peripheral FOV to an HMD user, according to some embodiments.
Figure 5B:
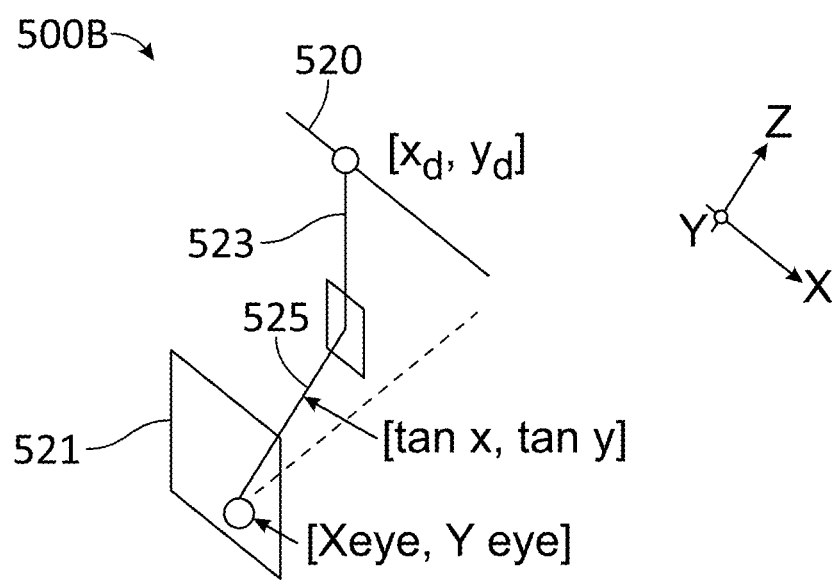
Figure 5C:
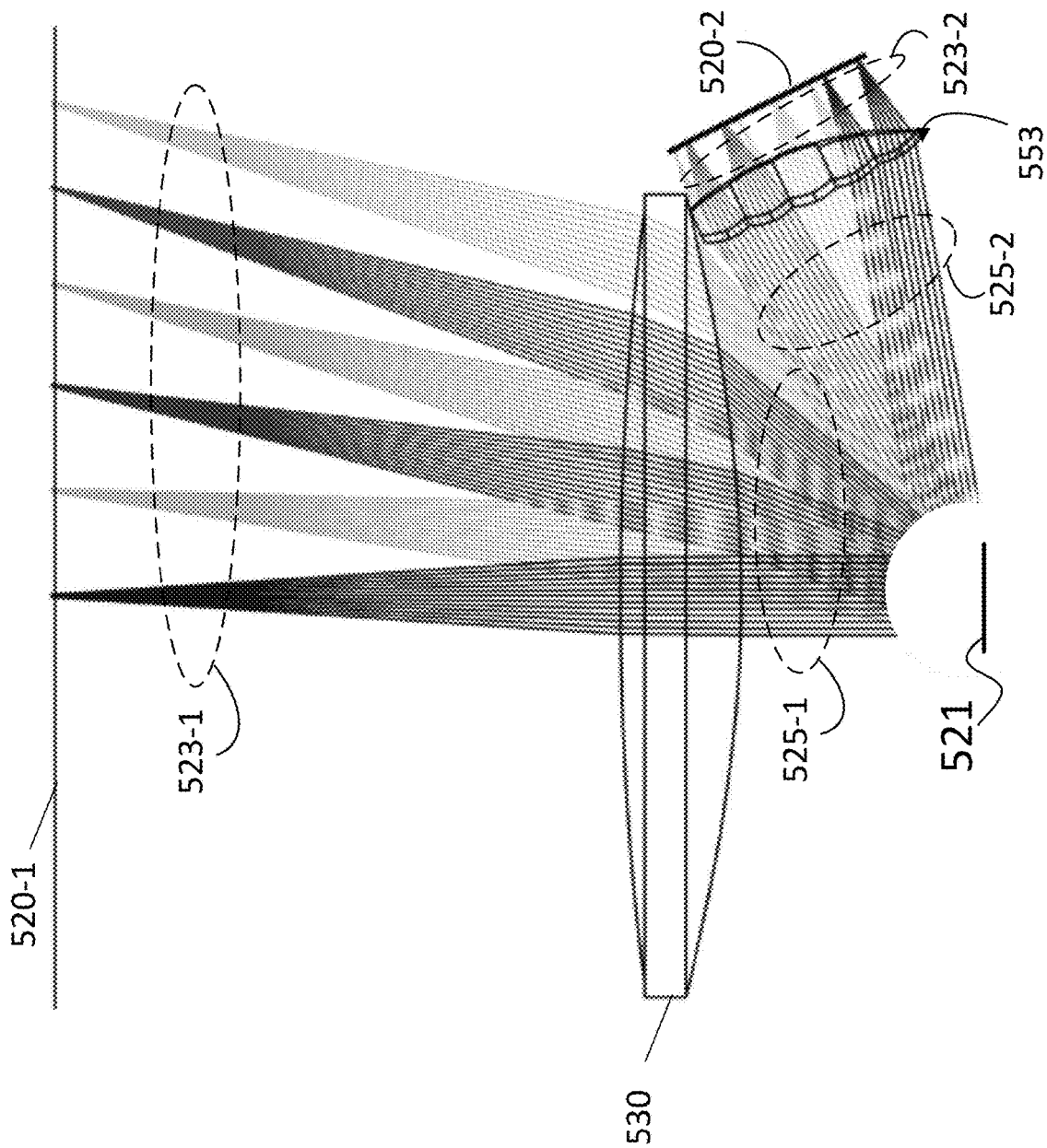

FIGS. 5A-5C illustrate free-form lenslet 501 for an MLA 553 to collect input light 523 from a display 520 to provide a peripheral FOV through an eyebox 521 of an HMD via output light 525, according to some embodiments.

FIG. 5A illustrates a distortion map 500A between display pixel coordinates [x,y] along the plane of display 520 into output angular coordinates [tan θ$_x$, tan θ$_y$] imaged through the free-form (e.g., non-axisymmetric) surface of lenslet 501 such that output light 525 goes through eyebox 521 for every (or the larger number of) pixel.

FIG. 5B illustrates a three-way distortion map 500B including eye pupil coordinates [x$_{eye}$, y$_{eye}$] in the plane of eyebox 521.

FIG. 5C illustrates a main display 520-1 that generates a central portion of the FOV with light 523-1, directed by a central lens 530 onto an eyebox 521 with light 525-1. A peripheral display 520-2 generates light 523-2 forming a peripheral portion of the FOV, and MLA 553, formed with multiple free-form lenslets 501, directs light 525-2 into eyebox 521, for the user. Displays 520-1 and 520-2 will be collectively referred, hereinafter, as "displays 520." Light beams 523-1 and 523-2 will be collectively referred to, hereinafter, as "input light 523." Light beams 525-1 and 525-2 will be collectively referred to, hereinafter, as "output light 525."

Figure 6A:
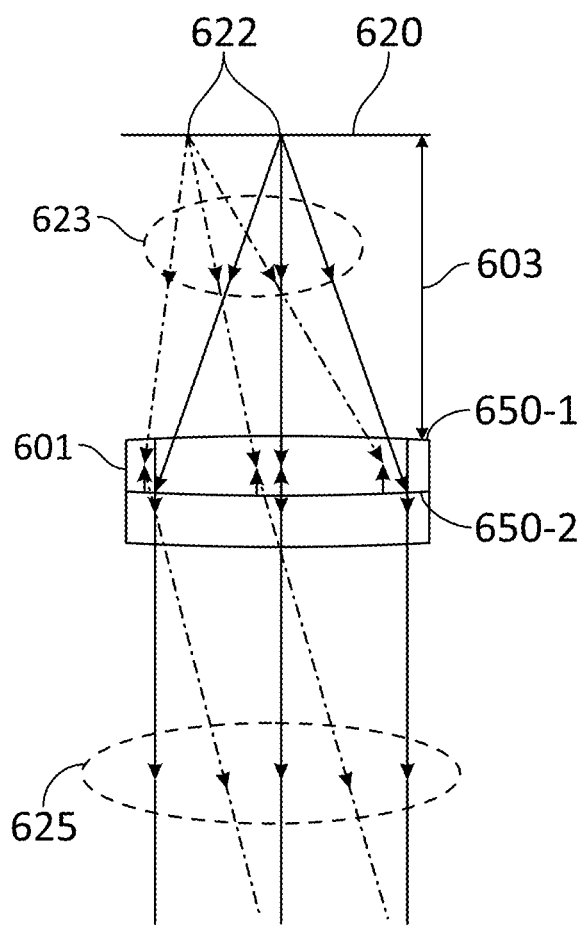
FIGS. 6A-6B illustrates a pancake lenslet for an MLA to collect light from a light field display to provide a peripheral FOV to an HMD user, according to some embodiments.
Figure 6B:
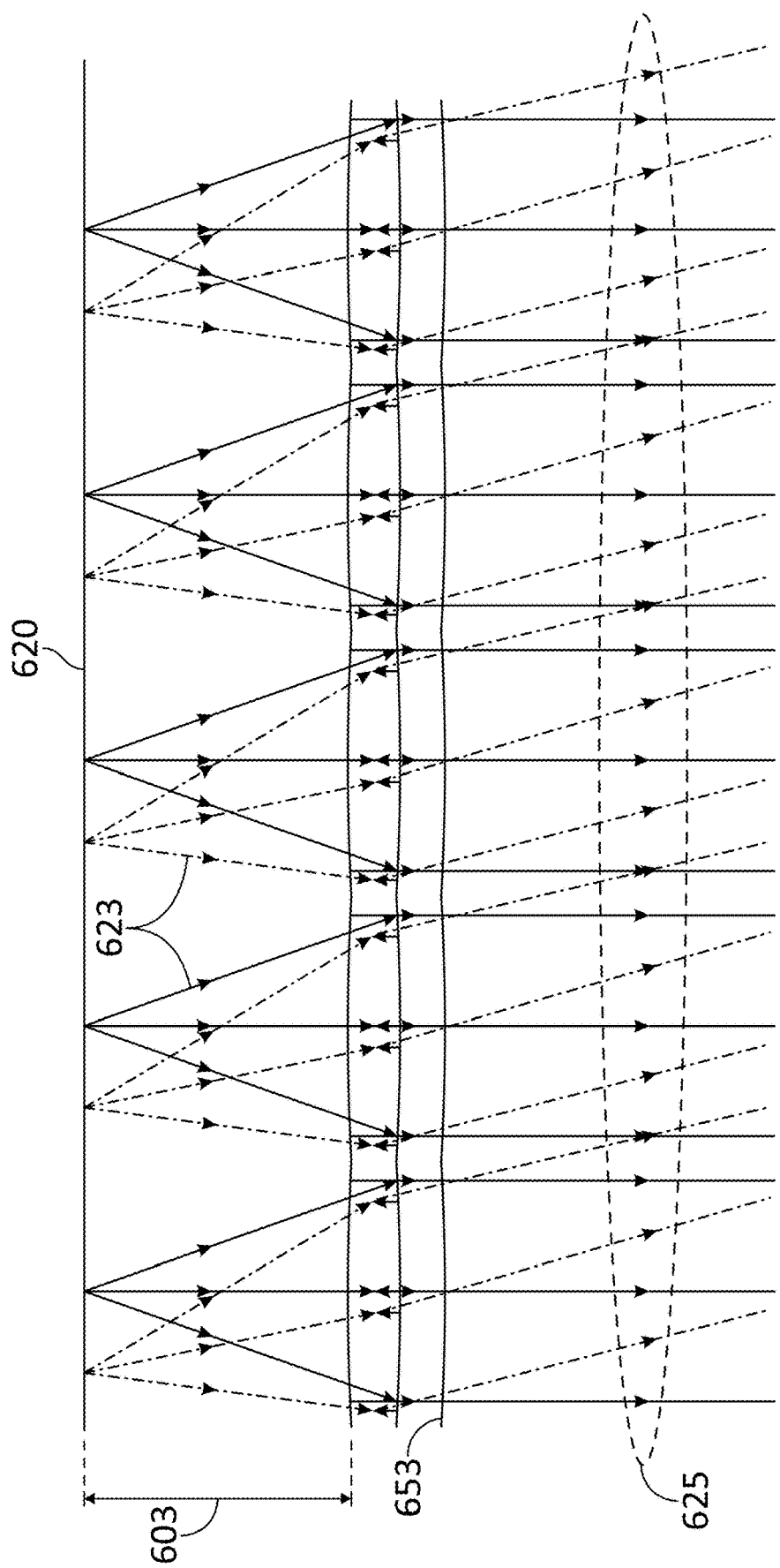

FIGS. 6A-6B illustrate a pancake lenslet 601 for an MLA 653 to collect light 623 from a display 620 to provide a peripheral FOV to an eyebox of an HMD, according to some embodiments. A pixel array 620 is adjacent to an MLA, of which only a micro lens 601 is shown, for illustrative purposes. Light field display 620 includes multiple pixels 622 generating light beams 623 directed to pancake lenslet 601. In some embodiments, a distance 603 between pixel array 620 and micro lens 601 may be approximately equal to the focal length of micro lens 601, and therefore outgoing light beams 625 may be collimated in different directions, depending on the specific position of the originating pixel 621. Pancake lenslet 601 includes two polarization sensitive surfaces 650-1 and 650-2 (hereinafter, collectively referred to as "polarization sensitive surfaces 650"). Accordingly, light beams 623 may be transmitted through a partial reflecting surface 650-1 (e.g., due to a first polarization state induced by a polarizer or by the emission properties of pixel array 620), and reflected from surface 650-2, which includes a quarter waveplate (QWP, to switch the polarization of the incoming light) and a reflective polarizer. Upon reflection, the polarization state of light beams 623 is reversed (e.g., by traversing a quarter waveplate between polarization sensitive surfaces 650), so that they are again reflected from surface 650-1 and then transmitted out at surface 650-2 as outgoing light beams 625. The net effect of pancake lenslet 601 is to increase the optical path of light beams 623 inside the lenslet, thereby increasing the optical power without increasing the width, weight, and bulk of the optics.

Figure 7:
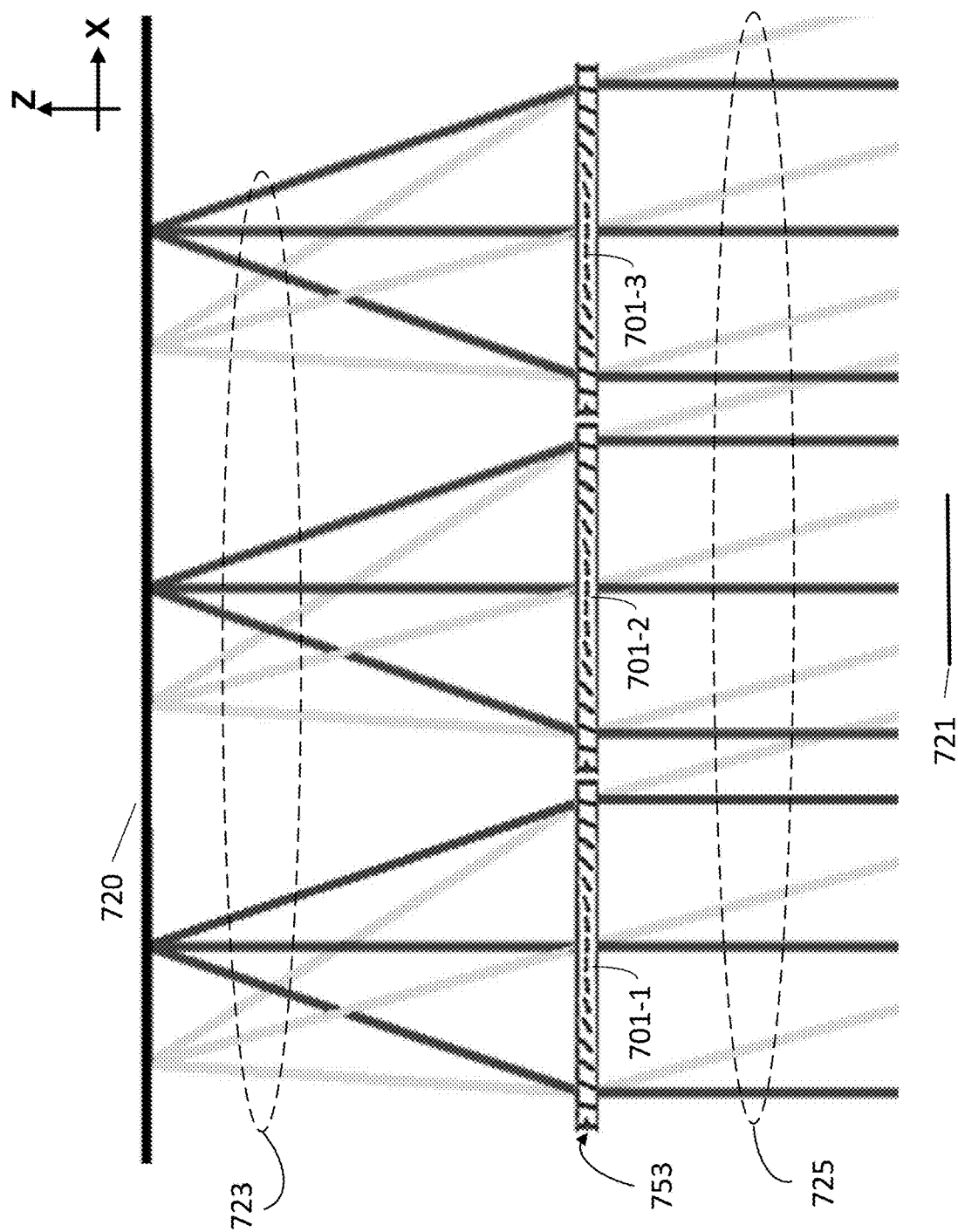
FIG. 7 illustrates a liquid crystal MLA to collect light from a light field display to provide a peripheral FOV to an HMD user, according to some embodiments.

FIG. 7 illustrates liquid crystal (LC) lenslets 701-1, 701-2, and 701-3 (hereinafter, collectively referred to as "LC lenslets 701") for an MLA 753 to collect light 723 from a light field display 720 to provide a peripheral FOV through an eyebox 721 of an HMD, according to some embodiments. Lenslet 701 includes a layer of liquid crystal. In some embodiments, light beams 723 may have a linear polarization provided by the light emitters in display 720. LC molecules inside LC lenslets 701 reorient according to the electric field provided by the electrodes and provide optical power to each of lenslets 701. The result is outgoing light beams 725 converging onto eyebox 721. Light beams 723 and 725 may be linearly polarized along the direction of the LC material in LC lenslets 701, either by placing linear polarizers before and after LC lenslet 701.

Figure 8B:
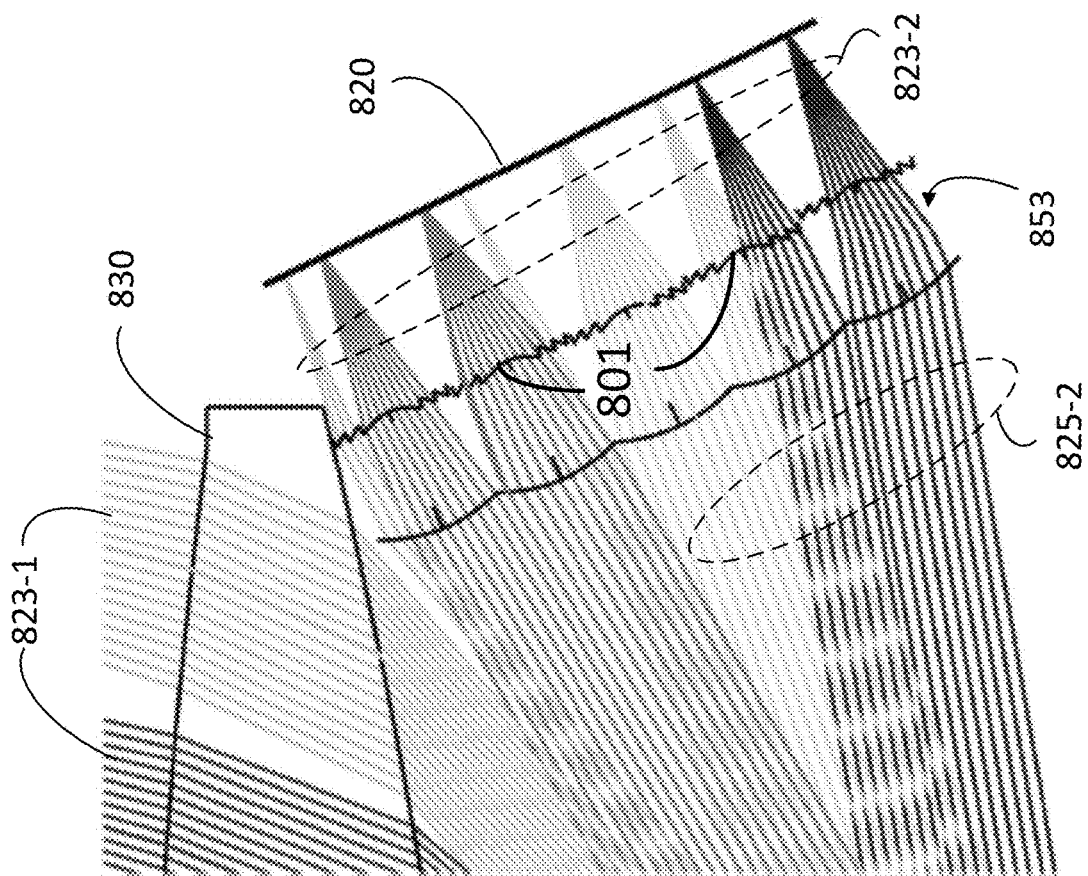

FIGS. 8A-8B illustrates a Fresnel lenslets 801 forming an MLA 853 to collect light 823 from a light field display 820 to provide a peripheral FOV in light beams 825 through an eyebox 821 of an HMD, according to some embodiments.

FIG. 8B illustrates MLA 853 directing light beams 823-2 into light beams 825-2. In some embodiments, a first surface of MLA 853 may include Fresnel lenslet 801, and a second surface may include a refractive surface that may include spherical elements, or free-form elements. Light beams 823-1 and 823-2 will be collectively referred to, hereinafter, as "input light 823." Light beams 825-1 and 825-2 will be collectively referred to, hereinafter, as "output light 825."

Figure 9:
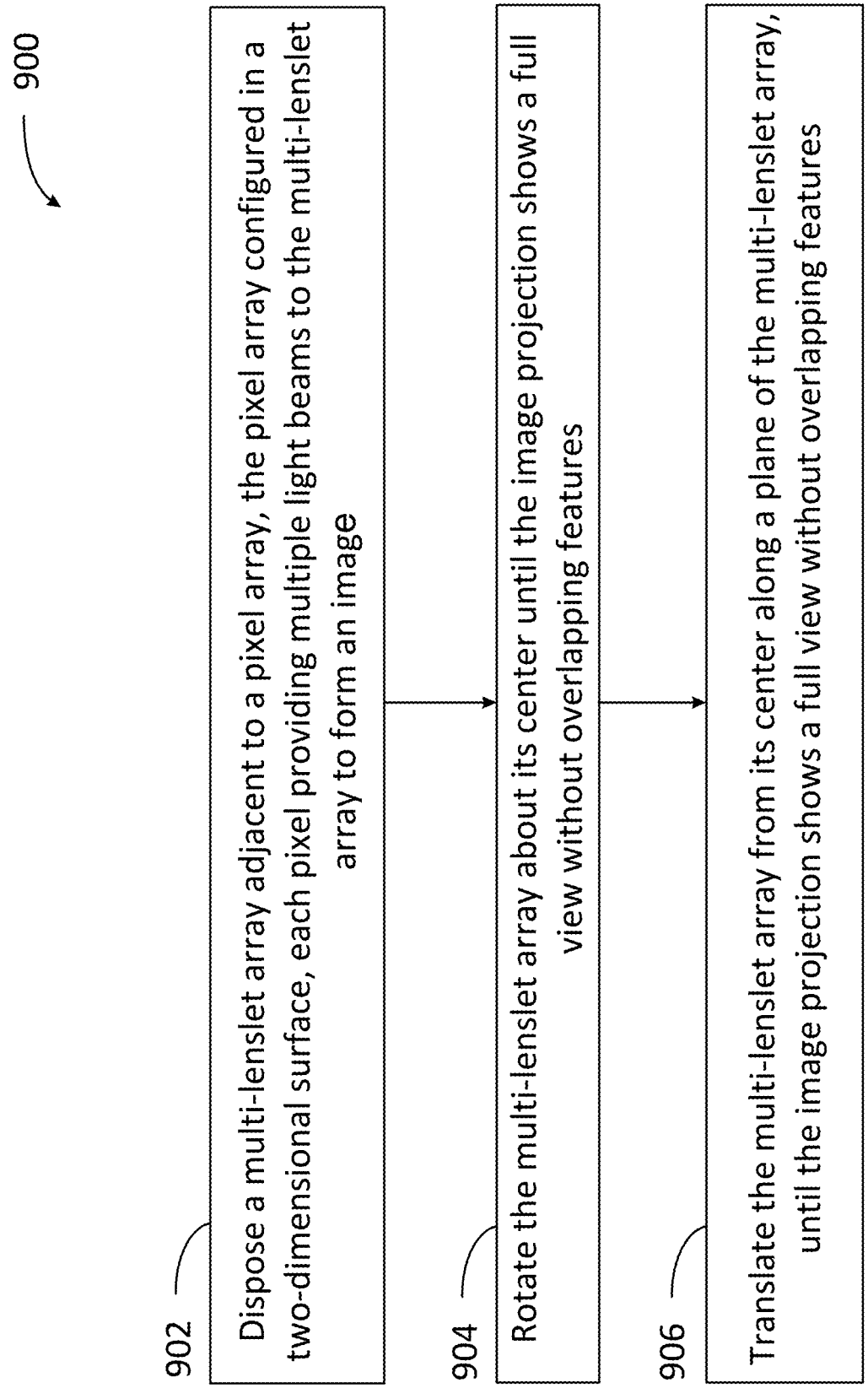
FIG. 9 is a flowchart illustrating steps in a method for mechanically aligning a multi-lenslet array with a light field display, according to some embodiments.

FIG. 9 is a flowchart illustrating steps in a method 900 for mechanically aligning a multi-lenslet array with a light field display, according to some embodiments. According to some embodiments, the multi-lenslet array and the light field display may be included in an HMD device as disclosed herein (e.g., HMD devices 100 and 300). The HMD may include a light field display having multiple pixels configured in a two-dimensional surface (e.g., pixel arrays and light field displays 120, 320, 350, 520, 620, 720, and 820), each pixel providing multiple light beams (e.g., light beams 123, 125, 523, 525, 623, 625, 723, 725, 823, and 825) forming an image through an eyebox of the HMD that limits a volume including a pupil of the user (e.g., eyeboxes 121, 521, 721, and 821). The HMD may also include an optical element configured to provide a central portion of an FOV for the image through the eyebox (e.g., optical elements 130 and 330). In some embodiments, the HMD device also includes an optical element configured to provide a peripheral portion of the field of view for the image through the eyebox (e.g., optical elements 153, and MLAs 353 and 453). Methods consistent with the present disclosure may include at least one or more of the steps in method 900 performed in a different order, simultaneously, quasi-simultaneously, or overlapping in time.

Step 902 includes disposing a multi-lenslet array adjacent to a pixel array, the pixel array configured in a two-dimensional surface, each pixel providing multiple light beams to the multi-lenslet array to form an image.

Step 904 includes rotating the multi-lenslet array about its center until the image projection shows a full view without overlapping features.

Step 906 includes translating the multi-lenslet array from its center along a plane of the multi-lenslet array, until the image projection shows a full view without overlapping features.

Figure 10:
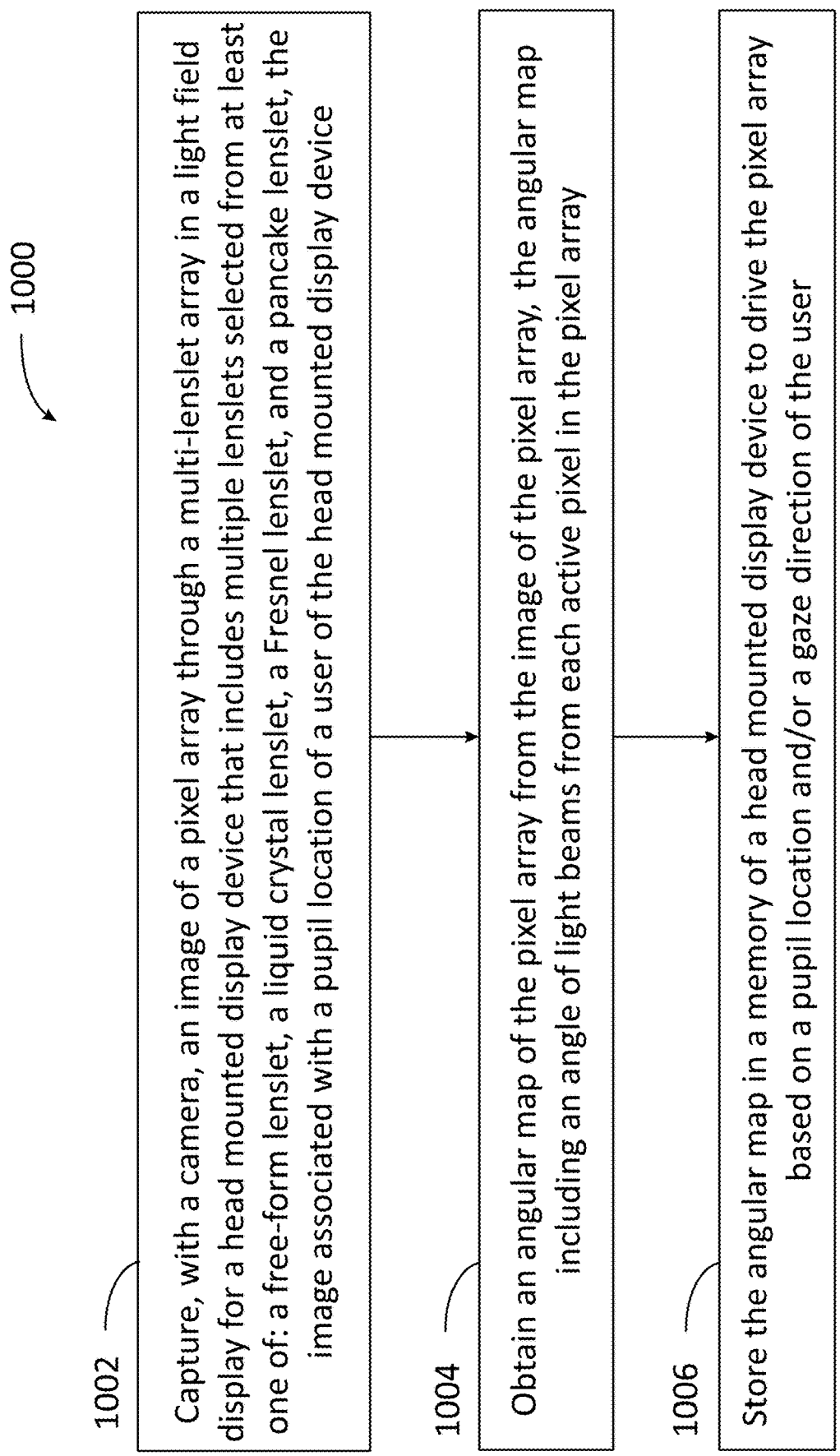
FIG. 10 is a flowchart illustrating steps in a method for digitally calibrating a light field display, according to some embodiments.

FIG. 10 is a flowchart illustrating steps in a method 1000 for digitally calibrating a light field display, according to some embodiments. Consistent with the present disclosure, a multi-lenslet array in the light field display may be included in an HMD device as disclosed herein (e.g., HMD devices 100 and 300). The HMD may include a pixel array having multiple pixels configured in a two-dimensional surface (e.g., pixel arrays and light field displays 120, 320, 350, 520, 620, 720 and 820), each pixel providing multiple light beams forming an image provided to a user (e.g., light beams 123, 125, 523, 525, 623, 625, 723, 725, 823, and 825). The HMD device may also include an optical element configured to provide a central portion of an FOV for the image through an eyebox that limits a volume including a pupil of the user (e.g., optical elements 130 and 330, and eyeboxes 121, 521, 721, and 821). In some embodiments, the HMD device also includes an optical element configured to provide a peripheral portion of the field of view for the image through the eyebox (e.g., optical elements 153, and MLAs 353 and 453). In some embodiments, a digital calibration of a light field display as disclosed herein may include creating multiple angular maps of the pixel array, each angular map associated with a pupil location and/or a gaze direction of the user, and storing the angular maps in a memory of the HMD device (cf. memory 122). Methods consistent with the present disclosure may include at least one or more of the steps in method 1000 performed in a different order, simultaneously, quasi-simultaneously, or overlapping in time.

Step 1002 includes capturing, with a camera, an image of a pixel array through a multi-lenslet array in a light field display for a head mounted display device that includes multiple lenslets selected from at least one of: a free-form lenslet, a liquid crystal lenslet, a Fresnel lenslet, and a pancake lenslet, the image associated with a pupil location of a user of the head mounted display device.

Step 1004 includes obtaining an angular map of the pixel array from the image of the pixel array, wherein the angular map includes an angle of multiple light beams from each active pixel in the pixel array.

Step 1006 includes storing the angular map in a memory of the head mounted display device, based on the pupil location. In some embodiments, step 1006 includes storing, in the memory of the head mounted display device, an instruction to activate a segment of the pixel array based on the angular map and the pupil location. In some embodiments, step 1006 includes storing a correction factor in the angular map based on a fit parameter of the head mounted display device on the user.

Figure 11:
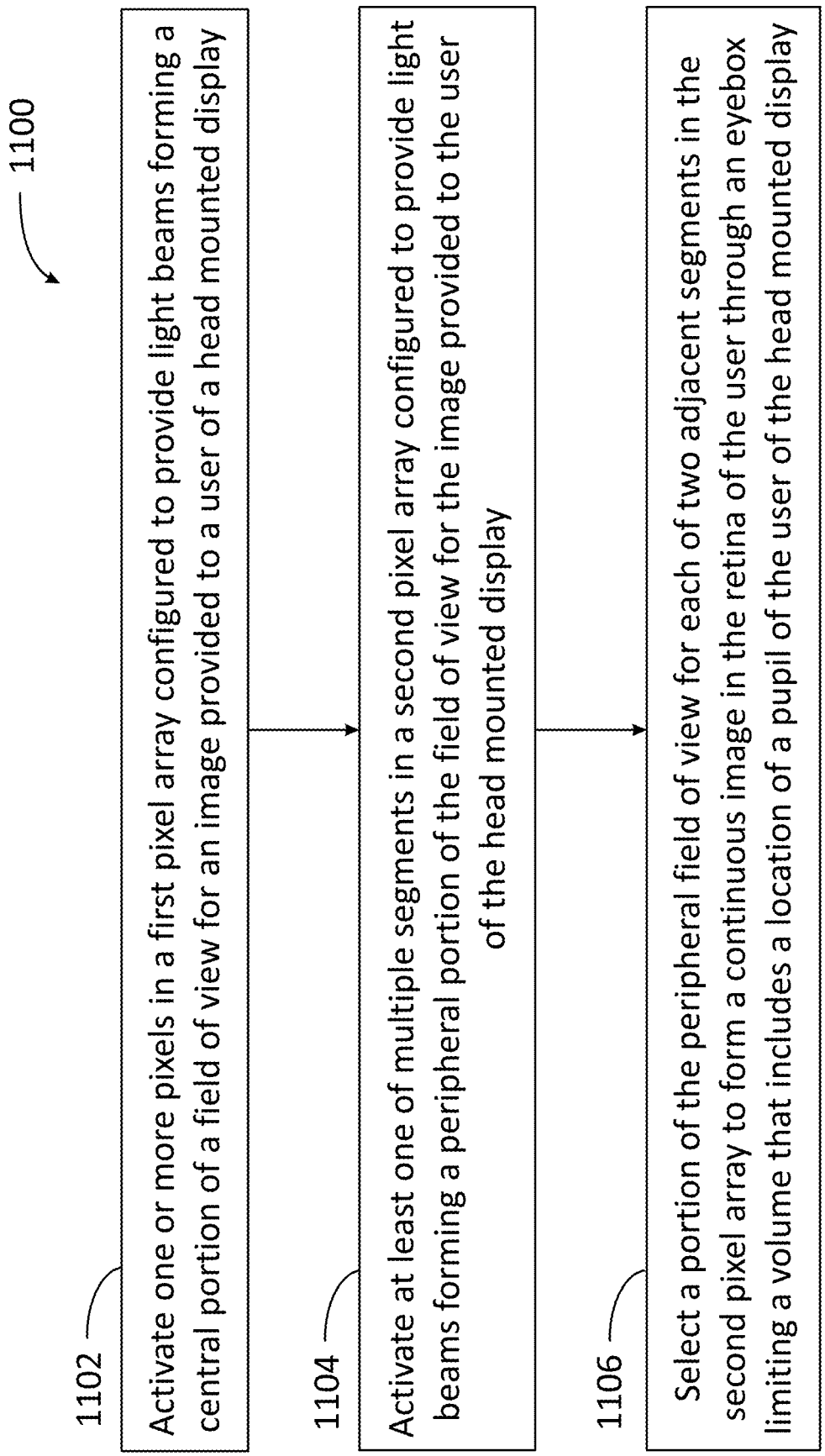
FIG. 11 is a flowchart illustrating steps in a method for providing a peripheral field of view to a user of an HMD device having a light field display, according to some embodiments.

FIG. 11 is a flowchart illustrating steps in a method 1100 for providing a peripheral field of view to a user of an HMD device having a light field display, according to some embodiments. According to some embodiments, the HMD device may include a multi-lenslet array and a light field display as disclosed herein (e.g., HMD devices 100 and 300). The HMD may include a pixel array having multiple pixels configured in a two-dimensional surface (e.g., pixel arrays and light field displays 120, 320, 350, 520, 620, 720 and 820), each pixel providing multiple light beams forming an image provided to a user (e.g., light beams 123, 125, 523, 525, 623, 625, 723, 725, 823, and 825). The HMD device may also include an optical element configured to provide a central portion of an FOV for the image through an eyebox that limits a volume including a pupil of the user (e.g., optical elements 130 and 330, and eyeboxes 121, 521, 621, 721, and 821). In some embodiments, the HMD device also includes an optical element configured to provide a peripheral portion of the field of view for the image through the eyebox (e.g., optical elements 153, and MLAs 353 and 453). Methods consistent with the present disclosure may include at least one or more of the steps in method 1100 performed in a different order, simultaneously, quasi-simultaneously, or overlapping in time.

Step 1102 includes activating one or more pixels in a first pixel array configured to provide light beams forming a central portion of an FOV for an image provided to a user of an HMD.

Step 1104 includes activating at least one of multiple segments in a second pixel array configured to provide light beams forming a peripheral portion of the FOV for the image provided to the user of the HMD.

Step 1106 includes selecting a portion of the peripheral FOV for each of two adjacent segments in the second pixel array to form a continuous image in the retina of the user through an eyebox limiting a volume that includes a location of a pupil of the user of the HMD.

Hardware Overview

Figure 12:
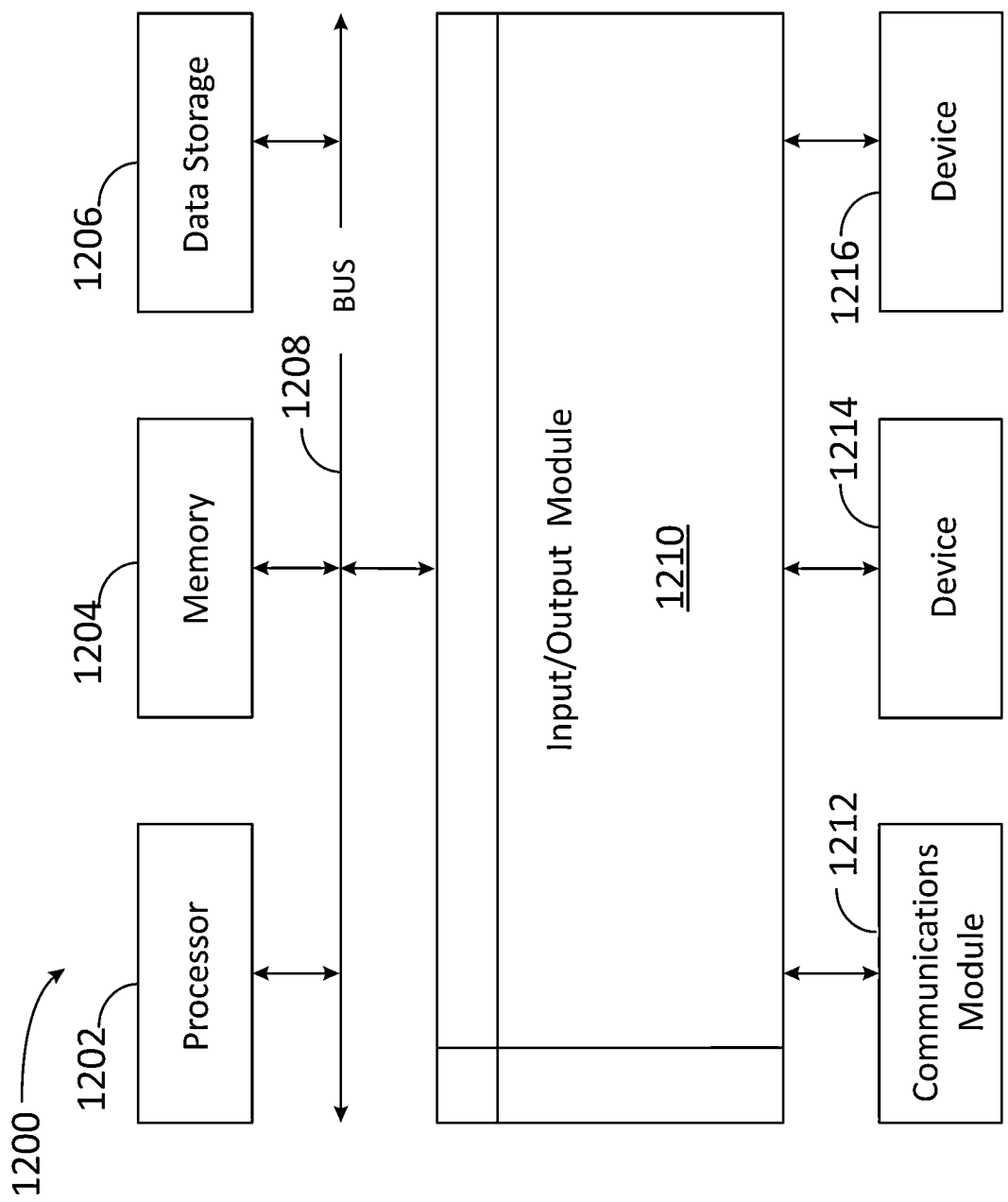
FIG. 12 is a block diagram illustrating an exemplary computer system with which the methods of FIGS. 9, 10, and 11 can be implemented, according to some embodiments.

FIG. 12 is a block diagram illustrating an exemplary computer system 1200 with which HMD device 100 of FIG. 1A, and methods 900, 1000, and 1100 can be implemented. In certain aspects, computer system 1200 may be implemented using hardware or a combination of software and hardware, either in a dedicated server, or integrated into another entity, or distributed across multiple entities. Computer system 1200 may include a desktop computer, a laptop computer, a tablet, a phablet, a smartphone, a feature phone, a server computer, or otherwise. A server computer may be located remotely in a data center or be stored locally.

Computer system 1200 includes a bus 1208 or other communication mechanism for communicating information, and a processor 1202 (e.g., processor 112) coupled with bus 1208 for processing information. By way of example, the computer system 1200 may be implemented with one or more processors 1202. Processor 1202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1200 can include, in addition to hardware, code that creates an execution environment for the computer program in question, e.g., code that constitutes processor firmware, a protocol stack, a database management system, an operating system, or a combination of one or more of them stored in an included memory 1204 (e.g., memory 122), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 1208 for storing information and instructions to be executed by processor 1202. The processor 1202 and the memory 1204 can be supplemented by, or incorporated in, special purpose logic circuitry.

The instructions may be stored in the memory 1204 and implemented in one or more computer program products, e.g., one or more modules of computer program instructions encoded on a computer-readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled with bus 1208 for storing information and instructions. Computer system 1200 may be coupled via input/output module 1210 to various devices. Input/output module 1210 can be any input/output module. Exemplary input/output modules 1210 include data ports such as USB ports. The input/output module 1210 is configured to connect to a communications module 1212. Exemplary communications modules 1212 include networking interface cards, such as Ethernet cards and modems. In certain aspects, input/output module 1210 is configured to connect to a plurality of devices, such as an input device 1214 and/or an output device 1216. Exemplary input devices 1214 include a keyboard and a pointing device, e.g., a mouse or a trackball, by which a consumer can provide input to the computer system 1200. Other kinds of input devices 1214 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 1216 include display devices, such as an LCD (liquid crystal display) monitor, for displaying information to the consumer.

According to one aspect of the present disclosure, HMD device 100 can be implemented, at least partially, using a computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in main memory 1204 causes processor 1202 to perform the process steps described herein. One or more processors in a multi-processing arrangement may also be employed to execute the sequences of instructions contained in memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1200 can include clients and servers. A client and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1204. Transmission media include coaxial cables, copper wire, and fiber optics, including the wires forming bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A device for virtual reality imaging, comprising:
   a pixel array including multiple pixels configured in a two-dimensional surface, each pixel providing multiple light beams forming an image provided to a user, wherein the two-dimensional surface of the pixel array is flat;
   a first optical element configured to provide a central portion of a field of view for the image through an eyebox that limits a volume including a pupil of the user; and
   a second optical element configured to provide a peripheral portion of the field of view for the image through the eyebox, wherein the second optical element includes a freeform lenslet array to provide a segmented view of the peripheral portion of the field of view, wherein the second optical element includes multiple lenslets selected from at least one of: a free form lenslet, a liquid crystal lenslet, a Fresnel lenslet, and a pancake lenslet.

2. The device of claim 1, wherein the central portion and the peripheral portion of the field of view together occupy at least one half steradian of a user's field of view when the device is worn by the user.

3. The device of claim 1, wherein the peripheral portion of the field of view has a higher angular resolution in an area of the peripheral portion of the field of view adjacent to the central portion of the field of view, wherein other regions of the peripheral portion of the field of view have lower angular resolutions.

4. The device of claim 1, wherein the second optical element provides an angular resolution that decreases in the peripheral portion of the field of view proceeding in an axial direction away from the central portion of the field of view.

5. The device of claim 1, wherein the pixel array includes one of a flexible organic light emitting diode array, a flexible liquid crystal display, or a light emitting diode array.

6. The device of claim 1, wherein the freeform lenslet array comprises multiple lenslets arranged with a pitch greater than one fourth of a focal length of each lenslet of the multiple lenslets, and
   wherein the light beams from a single pixel pass through the eyebox at a unique angle.

7. The device of claim 1, wherein the pixel array includes segmented portions of active pixels separated by a gap of inactive pixels, wherein two sub-portions of the peripheral portion of the field of view of the image from two adjacent segmented portions of multiple active pixels form a continuous image on a retina of the user, and the light beams from the segmented portions of active pixels go through the eyebox at an angle that is unique for each pixel, based on a location of the pupil of the user.

8. A device for virtual reality imaging, comprising:
   a pixel array including multiple pixels configured in a two-dimensional surface, each pixel providing multiple light beams forming an image provided to a user;
   a first optical element configured to provide a central portion of a field of view for the image through an eyebox that limits a volume including a pupil of the user; and
   a second optical element configured to provide a peripheral portion of the field of view for the image through the eyebox, wherein the second optical element includes a lenslet array to provide a segmented view of the peripheral portion of the field of view that includes multiple lenslets selected from at least one of: a free form lenslet, a liquid crystal lenslet, a Fresnel lenslet, and a pancake lenslet,
   wherein the central portion and the peripheral portion of the field of view together occupy at least one half steradian of a user's field of view when the device is worn by the user.

9. The device of claim 8, wherein the peripheral portion of the field of view has a higher angular resolution in an area of the peripheral portion of the field of view adjacent to the central portion of the field of view, wherein other regions of the peripheral portion of the field of view have lower angular resolutions.

10. The device of claim 8, wherein the second optical element provides an angular resolution that decreases in the peripheral portion of the field of view proceeding in an axial direction away from the central portion of the field of view.

11. The device of claim 8, wherein:
    the pixel array includes a conical display that wraps around the first optical element, and
    the second optical element is a lenslet array that wraps around the first optical element to provide the peripheral portion of the field of view for the image through the eyebox.

12. The device of claim 8, wherein the two-dimensional surface follows a one-dimensional curvature.

13. The device of claim 8, wherein the pixel array includes one of a flexible organic light emitting diode array, a flexible liquid crystal display, or a light emitting diode array.

14. The device of claim 8, wherein the freeform lenslet array comprises multiple lenslets arranged with a pitch greater than one fourth of a focal length of each lenslet of the multiple lenslets, and
    wherein the light beams from a single pixel pass through the eyebox at a unique angle.

15. A device for virtual reality imaging, comprising:
- a pixel array including multiple pixels configured in a two-dimensional surface, each pixel providing multiple light beams forming an image provided to a user;
- a first optical element configured to provide a central portion of a field of view for the image through an eyebox that limits a volume including a pupil of the user; and
- a second optical element configured to provide a peripheral portion of the field of view for the image through the eyebox, wherein the second optical element includes a lenslet array to provide a segmented view of the peripheral portion of the field of view that includes multiple lenslets selected from at least one of: a free form lenslet, a liquid crystal lenslet, a Fresnel lenslet, and a pancake lenslet,
- wherein the pixel array includes segmented portions of active pixels separated by a gap of inactive pixels, wherein two sub-portions of the peripheral portion of the field of view of the image from two adjacent segmented portions of multiple active pixels form a continuous image on a retina of the user, and the light beams from the segmented portions of active pixels go through the eyebox at an angle that is unique for each pixel, based on a location of the pupil of the user.

16. The device of claim 15, wherein the peripheral portion of the field of view has a higher angular resolution in an area of the peripheral portion of the field of view adjacent to the central portion of the field of view, wherein other regions of the peripheral portion of the field of view have lower angular resolutions.

17. The device of claim 15, wherein the second optical element provides an angular resolution that decreases in the peripheral portion of the field of view proceeding in an axial direction away from the central portion of the field of view.

18. The device of claim 15, wherein:
- the pixel array includes a conical display that wraps around the first optical element, and
- the second optical element is a lenslet array that wraps around the first optical element to provide the peripheral portion of the field of view for the image through the eyebox.

19. The device of claim 15, wherein the two-dimensional surface follows a one-dimensional curvature.

20. The device of claim 15, wherein the pixel array includes one of a flexible organic light emitting diode array, a flexible liquid crystal display, or a light emitting diode array.

* * * * *